United States Patent
Bloom

(10) Patent No.: US 6,199,357 B1
(45) Date of Patent: Mar. 13, 2001

(54) REEL PICKUP TINE

(75) Inventor: Max R. Bloom, St. Charles, IA (US)

(73) Assignee: Alamo Group Inc., Seguin, TX (US)

( * ) Notice: Subject to any disclaimer, the term of this patent is extended or adjusted under 35 U.S.C. 154(b) by 0 days.

(21) Appl. No.: 09/362,142

(22) Filed: Jul. 28, 1999

Related U.S. Application Data

(60) Provisional application No. 60/108,445, filed on Nov. 13, 1998.

(51) Int. Cl.$^7$ .................................................. A01D 57/02
(52) U.S. Cl. ......................... 56/220; 56/400.16; 403/260
(58) Field of Search ..................... 56/220, 227, 400.16, 56/400.19, 400.21, DIG. 20, DIG. 21; 403/110, 196, 197, 256, 260

(56) References Cited

U.S. PATENT DOCUMENTS

| | | |
|---|---|---|
| 3,616,631 | 11/1971 | Quam . |
| 4,520,620 | 6/1985 | Gessel et al. . |
| 4,882,899 | 11/1989 | Jasper et al. . |
| 5,127,216 | 7/1992 | Kelderman . |

Primary Examiner—Christopher J. Novosad
(74) Attorney, Agent, or Firm—Gunn, Lee & Keeling

(57) ABSTRACT

The invention comprises a two-piece pickup tine consisting of a clamp and wing portion removably secured to a finger portion. The clamp portion is also removably securable to any standard pickup reel bar. The tine is designed to work cooperatively with a plurality of other tine on the same reel bar. The tine is equipped with a middle recess designed for optimal integrity and prevention of damage to the tine's finger portion. Additionally, the tine is designed as a two piece unit with the clamp portion is much less susceptible to damage. As a result of the present design, the cost of replacement is drastically reduced. That is, it is much less likely that damage will occur to a tine, and if damage does occur only replacement of the tine's finger portion should be necessary.

17 Claims, 3 Drawing Sheets

REEL PICKUP TINE

Applicant claims priority under 35 U.S.C. § 119 of U.S. Provision Application Ser. No. 60/108,445 filed Nov. 13, 1998.

BACKGROUND OF THE INVENTION

The present invention relates to pickup tines on harvester pickup reels, and more particularly, to an improved pickup tine designed to avoid breakage and deformation. The present invention also provides an increase in section modules and reduces the cost of the replacement tine since only one part should generally ever require replacement.

Harvesters consist of a rotating cylinder and reel bars with teeth attached thereto. The rotating cylinder is attached at the front of the harvester and runs parallel to the field from which crops are to be harvested. Generally a series of reel bars are placed circumferentially around the rotating cylinder and positioned parallel therewith. As the harvester moves forward the cylinder rotates in that same direction. Likewise, the reel bars begin to rotate around the cylinder. As the reel bars rotate they carry the teeth around the cylinder and eventually force the teeth to make contact with the crops to be harvested and the ground from which the crop is taken. A unique embodiment of these "teeth", which are better known as tines or reel pickup tines are the focus of the present invention.

Pickup tines are commonly made of plastic having many different shapes. They are used on harvester pickup reels. Earlier plastic tines have generally been less than satisfactory in the field due to breakage or permanent bends which shut down the harvesting operation until the tine can be replaced. Shutting down the harvesting operation due to a broken tine can be very costly in terms of time lost due to the potentially hundreds of tines, all susceptible to damage, which exist on a single harvester. To offset any lost time it is often the case that harvesting is not shut down until numerous tines have become deformed or damaged beyond repair. However, this failure to replace missing, damaged, and broken tines only leads to lost crops in lieu of lost time. The problem of breakage and deformation of plastic tines has been addressed before (See U.S. Pat. No. 4,882,899). While the present invention also addresses this problem it goes on to recognize that breakage and deformation will inevitably occur with plastic tines. Therefore, a novel readily replaceable tine is also disclosed so that when tines are eventually replaced they are done so with a minimal amount of lost time.

SUMMARY OF THE INVENTION

It is another object of the present invention to provide a tine composed of two separate components, one of which is less susceptible to damage.

It is yet another objective of the present invention to provide a tine which may be fixed simply, quickly and efficiently upon damage to its finger portion.

It is a further object of the present invention to provide a tine having a clamp portion separate from a finger portion whereby the finger portion may be precisely and removably secured by the clamp portion.

It is an object of the present invention to provide durable tine of efficient shape to promote avoidance of deformation and breakage.

It is another object of the present invention to provide a tine of optimum strength to weight ratio to enhance its integrity.

In satisfaction of these and related objectives, the present invention provides a novel two-piece tine with increased strength resulting from the molding of the tine in an efficient shape which markedly increases the strength-to-weight ratio and allows the replacement of the finger portion of the tine and saving the cost of the clamping portion of the tine.

DESCRIPTION OF THE PREFERRED EMBODIMENT

Figure 1:
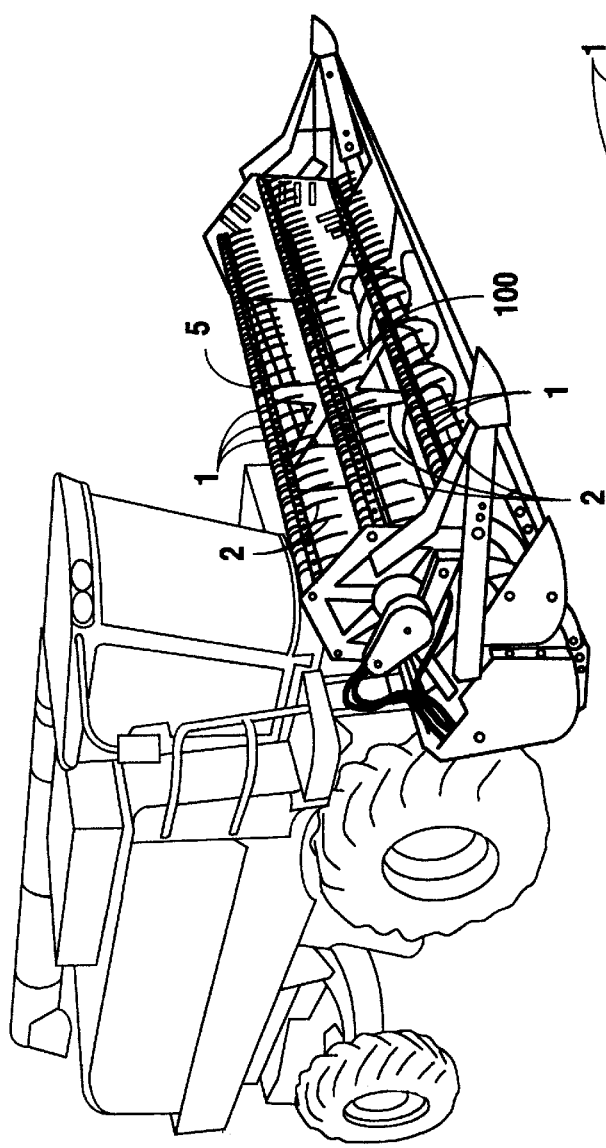
FIG. 1 is a perspective view of a harvester.

A tine is provided having a finger portion (2) and a clamp portion (1). The finger portion (2) of the tine has a fairly consistent thickness front-to-rear to allow reasonable flexure without breaking and is tapered more severely side-to-side from a finger head portion (39) attaching to the clamp portion (1) to a finger tip (26) in generally the shape of a wide-flanged beam which increases in strength side-to-side constantly from the tip (26) up to the finger head (39). The finger head (39) is of constant width in rectangular shape to fit into a securing recess (45) of the clamp portion (1) of the tine and has a protrusion (7) on the end which locates the tine securely and precisely by being inserted into a matching hole (8) in any provided pickup reel bar (5).

There is a recess in the finger head (39) of the tine finger (2) that is fitted onto an extension (15) on the clamp (1) which precisely locates the finger portion (2) in reference to the clamp (1).

The clamping portion (1) has two wings (34, 35) of uneven length with metered end portions that overlap. The clamp also has a circular clamp head portion (4) that goes around the reel bar (5) and clamps the tine in place. The two parts of the tine are securely fastened together with an appropriate screw (9).

The design of the two-piece tine was made using finite element studies to search for the most ideal cross-sections, laboratory tested, and then thoroughly field-tested in conjunction with other plastic tines for comparison of serviceability which proved this section to be superior in performance.

Figure 2:
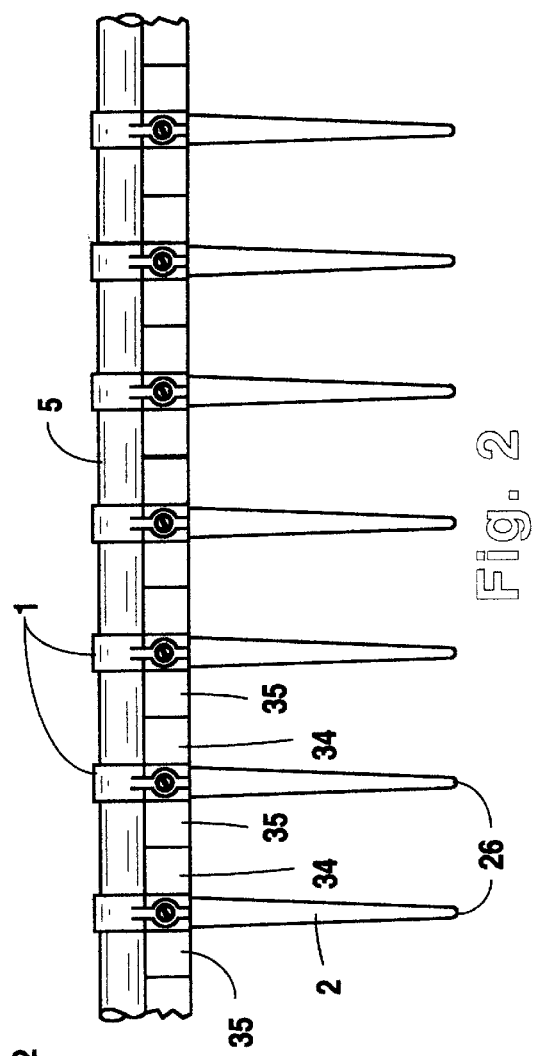
FIG. 2 is a front view of a harvester reel bar containing harvester pickup tine thereon.

Referring to FIGS. 1 and 2 a harvester and reel bar are shown. The harvester is shown with a front rotating cylinder portion (100) and several reel bars (5) placed parallel and circumferentially there around. Referring more specifically to FIG. 2 a harvester reel bar (5) is shown with several tine of the present invention thereon. This latter depiction reveals the manner in which the tine are able to act in concert as a single unit by interconnection of alternating wings (34, 35).

Figure 3:
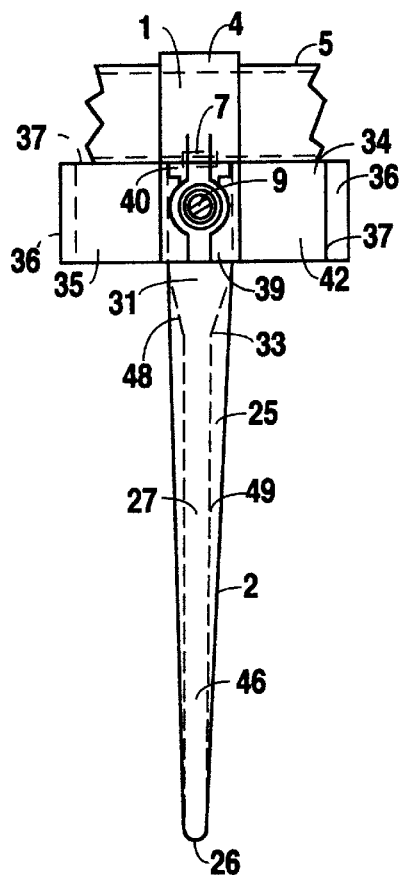
FIG. 3 is a front view of an assembled two-piece tine.

Referring to FIG. 3 a two piece tine is shown having a clamp portion (1) for securing the tine to a reel bar (5) and a finger portion (2) extending downward from the clamp portion (1). The finger portion (2) is shaped with a middle recess (25) on each of its sides designed to provide optimum flexibility without sacrificing the strength of the finger portion (2). A properly designed recess (25) is the key to the tine's optimum strength to weight ratio.

The clamp portion (1) of the tine consists of a clamp head (4) which extends downward into a clamp neck (40). A short wing (35) extends from the clamp neck (40) as does a long wing (36) opposite the short wing (35). Each wing provides a wing extension (36) extending beyond a wing recess (37) at the end of the respective wing. The recess (37) is carved out of the rearward surface (42) of the long wing (34) and out of the forward surface (43) of the short wing (35) (see FIG. 6). The extension (36) and recess (37) allow each wing of the tine to receive an adjacent wing of an adjacent tine (See FIG. 6).

The finger portion (2) of the tine consists of a protrusion (7) extending upward from its finger head (39). The protrusion (7) is between one-half and one inch in diameter, preferably around 0.37 inches, and up to one quarter of an inch in length, preferably around 0.18 inches. The finger head (39) is that portion of the finger portion (2) secured within the clamp portion (1) by a securing recess (45) (See FIG. 6) once a screw (9) is threaded entirely through the clamp (1) and finger (2) portions. The finger head (39) region is between one-half and one inch in width, preferably around 0.75 inches, between one quarter and one inch in thickness, preferably around 0.40 inches, and between three quarters and one and one-half inches in length, preferably around 1.25 inches. As the finger portion (2) extends downward it tapers and eventually terminates at a finger tip (26). The tapering takes the width of the finger portion from between one-half and one inch, preferably around 0.75 inches, down to one-half of an inch or less, preferably around 0.25 inches. The tapering also reduces the thickness of the finger portion from between one quarter and one inch, preferably around 0.40 inches, down to one-half of an inch or less, preferably around 0.25 inches. As the finger portion (2) extends downward from its finger head (39) it also tapers internally between its rearward surface (46) and its forward surface (47) (See FIG. 4). This internal tapering initially involves the most severe tapering of the finger portion (2) in the form of a steep taper (48). The steep taper (48) continues downward to an apex (33). The steep taper (48) and apex (33) define the finger neck (31). Due to the distinguishable internal tapering, a middle recess (25) exists internally of the finger portion. The middle recess (25) is greatest at the apex (33). From the apex (33) downward, internal tapering is decreased or halted altogether in the form of a spine taper (49) which defines the spine (27) of the finger portion (2). The spine taper (49) eventually ceases to exist as it approaches the fingertip (26).

Figure 4:
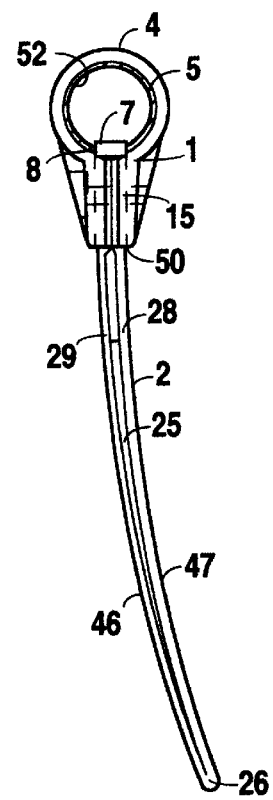
FIG. 4 is a side view of the two-piece tine shown in FIG. 1.

Referring to FIG. 4 the clamp portion (1) is shown with its clamp head (4) capable of securing the tine to a reel bar (5). The finger portion (2) is shown with a protrusion (7) extending upwards beyond the inner surface (52) of the clamp head (4). The protrusion (7) is secured by a matching hole (8) of the reel bar (5).

The clamp portion (1) terminates at the base (50) of its clamp neck (40) (see FIG. 3). Viewing the finger portion (2), the middle recess (25) is readily distinguishable. The middle recess (25) is bordered by a forward lip (28) and a rearward lip (29) which converge at the fingertip (26) along with the spine (27) (see FIG. 3).

Figure 5:
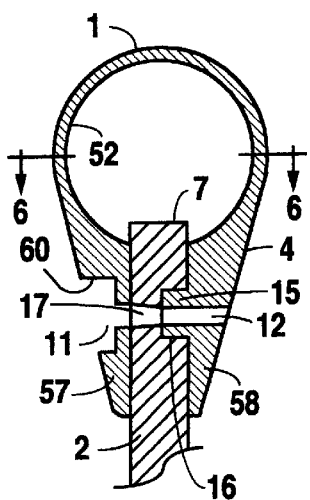
FIG. 5 is a cross sectional side view of a clamp portion of the tine showing internal structure.

Referring to FIG. 5 the clamp portion (1) and the finger portion (2) are secured together by a screw (9) (See FIG. 3). The screw (9) is inserted through a bore hole (11) of the clamp portion (1) and travels through the finger hole (17) of the finger portion (2) then exits through an opposite bore hole (12) of the clamp portion (1). The screw (9) does not protrude beyond the surface of the clamp portion (1) due to a protective rim (60) of the clamp portion (1) which circumferentially encloses the head of the screw (9). This prohibits any accidently loosening movement of the screw (9). The screw (9) serves the added function of clamping the clamp portion (1) to the reel bar (5) (as shown in FIG. 4). In addition to the screw (9), security between the clamp portion 1 and the finger portion (2) is provided by way of an extension (15) of the clamp portion (1) which is also received by a receiving portion (16) of the finger hole (17). Cross section lines 6—6 are shown in reference to FIG. 6.

Figure 6:
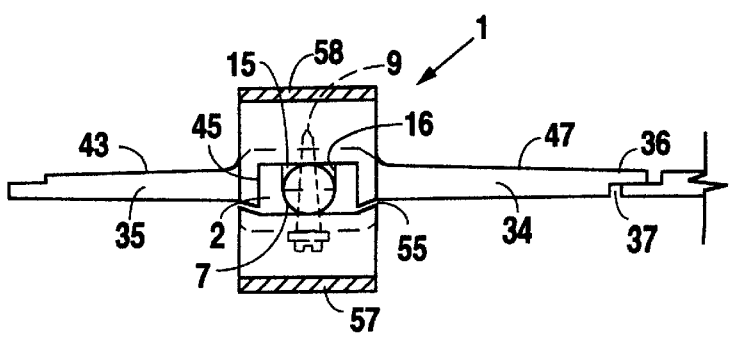
FIG. 6 is a top partial sectional view of a tine taken at section lines 4—4 of FIG. 3 showing wing overlap of tines in use.

The clamp portion (1) is separable into a forward clamp (58) and a rearward clamp (57) at a split region (55) (See FIG. 6). A single screw (9) performs the functions of minimizing the split region (55), clamping the rearward clamp (57) and the forward clamp (58) together, clamping the time to the real bar at the inner surface (52) of the clamp head (4), and securing the finger portion (2) within the clamp portion (1) which in turn further secures the tine to the reel bar via its protrusion (7) (see FIG. 6). This manner of securing the tine to the real bar allows for ease of replacement of the finger portion (2). While the finger portion (2) is specially designed to avoid a breakage and deformation, as discussed further herein, the present invention recognizes that some degree of breakage and/or deformation is bound to occur where the finger portion (2) is made of plastic. When such breakage or deformation does occur, the present invention allows for the removal of a single screw (9) in order to effect complete removal of the finger portion (2). The damaged finger portion (2) may then be removed while the clamp portion (1) remains resting on the reel bar (5) (see FIG. 3). A new finger portion (2) may merely be reinserted at the split region (55) of the clamp portion (1) followed by replacement of the screw (9) (see FIG. 6).

While replacement of the finger portion (2) is accomplished quickly and easily, the finger portion (2) is nevertheless held very securely in the interim. In fact, the finger portion (2) is held so securely that it will be damaged or broken before coming loose in spite of its specially designed anti deformation characteristics discussed further herein.

Referring to FIG. 6 the split region (55) dividing the rearward clamp (57) and the forward clamp (58) is visible. The finger portion (2) is shown securely held within the securing recess (45) of the clamp portion (1). Wings ofadjacent tine are shown overlapping due to corresponding wing extensions (36) and wing recesses (37). This overlap provides added stability to the tines of the harvester pick up system by unifying the tines to work in concert as a single set.

Figure 7:
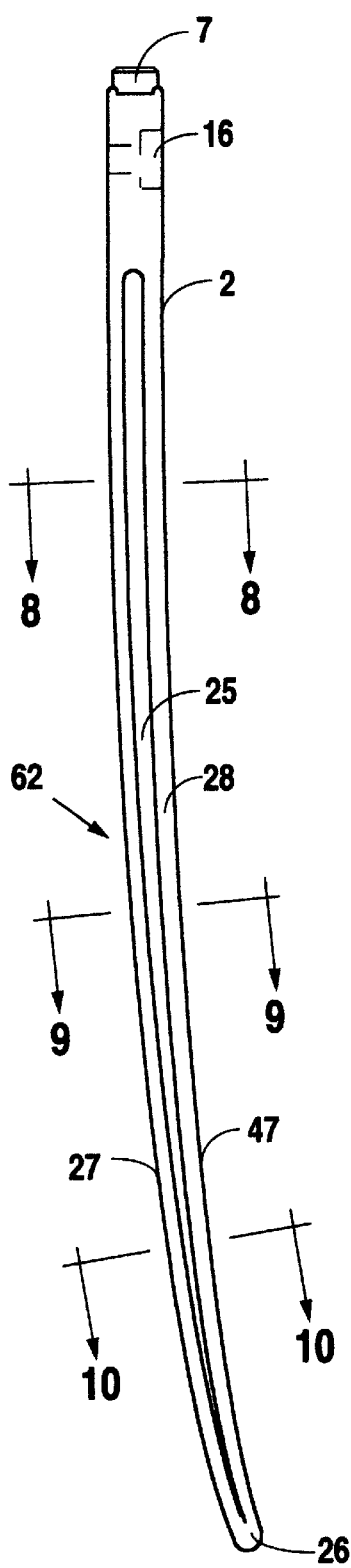
FIG. 7 is a side view of the tine finger portion alone.

Referring to FIG. 7 the protrusion (7) and receiving portion (16) may be seen apart from the clamp portion (1) (not shown). The finger portion (2) is shown having a curve at its finger body (62) developed to provide the most aggressive and efficient action for gathering crop material without entanglement. The finger body (62) is that portion of the finger portion which is tapered. Cross section lines 8—8, 9—9, and 10—10 are shown in reference to FIGS. 8, 9, and 10.

As the finger portion (2) extends downward to its finger tip (26) its width decreases with respect to both its side and front portions (See FIGS. 3 and 4). This decrease in width and thickness results in the finger portion (2) being flexible as it approaches its finger tip (26). Flexibility is needed at this end as stress from the cultivated crop is felt most here. Nevertheless the finger portion (2) has a concave shape at its forward surface (47) so as to promote cultivation in that direction. While the finger portion (2) is flexible, it will naturally return to this concave shape when cultivation stressors allow. Due to the middle recess (25), especially at its apex (33) (See FIG. 3), the finger portion (2) is also unusually flexible at this higher region. That is, while the decreasing thickness of the finger portion (2) promotes its flexibility in the direction of the finger tip (26), the increasing width of the middle recess (25) promotes flexibility in the direction of the apex (33). The end result is an overall more flexible tine without sacrifice of overall tine thickness nor integrity.

Figure 8:
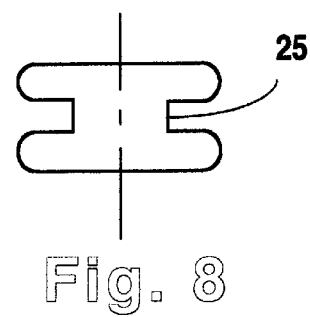
FIG. 8 is a sectional view of the tine finger portion taken from the cross section 6—6 of FIG. 5.
Figure 9:
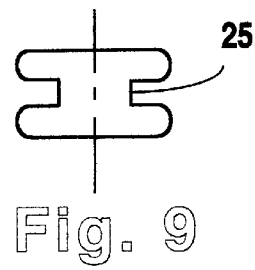
FIG. 9 is a sectional view of the tine finger portion taken from the cross section 7—7 of FIG. 5.
Figure 10:
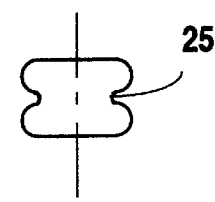
FIG. 10 is a sectional view of the tine finger portion taken from the cross section 8—8 of FIG. 5.

Referring to FIGS. 7, 8, 9, and 10 the middle recess (25) is shown at near maximum depth at FIG. 8, near the apex (33), at a reduced depth at FIG. 8, and at a nominal and termninating depth at FIG. 10, near the finger tip (26). While the width of the middle recess (25) decreases, so does its depth with respect to the lips (27, 28) due to the decreasing width of the finger portion (2) (See FIG. 3). A continuous depiction of a middle recess (25) depth is shown at FIG. 3 for comparison.

The present invention provides a two piece harvester pickup tine capable of being secured to a reel bar (5) along with a plurality of other tines. The tine is designed to work in conjunction with a multitude of other tines on the reel bar (5) simultaneously for agricultural harvesting. While the tine is specially designed with a recess (25) to maintain integrity and flexibility, should the tine's finger portion (2) break, it is readily replaceable without complete removal of the tine.

Various modifications of the preferred design may be made and remain within the scope of the design. For example, the curve, tapers, shape, and material of the tine may be of various interchangeable types. The length, width, and thickness of the tine, clamp and wings may vary. The length, size, type, and number of screws may also vary. Such modifications are contemplated as being within the scope of claim coverage and respective equivalents.

What is claimed is:

1. A pickup tine for mounting on a harvester reel bar of agricultural equipment comprising:
   a clamp portion for securing said pickup tine to said harvester reel bar, said clamp portion having a clamp head and an inner surface thereof, said inner surface designed to maintain contact with said harvester reel bar; and
   a finger portion removably secured to said clamp portion, said clamp portion capable of receiving said finger portion through a split region and within a securing recess of a clamp neck of said clamp portion, said split region separating a rearward clamp from a forward clamp of said clamp portion;
   said finger portion having a design shape for raking of agricultural products in a forward direction in unison with a plurality of finger portions of a plurality of pickup tines simultaneously mounted to said harvester reel bar, said design shape being concave with respect to said agricultural products and said forward direction.

2. The pickup tine for mounting on a harvester reel bar of agricultural equipment of claim 1 molded from a high-strength flexible plastic material to assure long life, economy, and efficiency.

3. The pickup tine for mounting on a harvester reel bar of agricultural equipment of claim 1 wherein said rearward clamp further comprises a bore hole, said forward clamp further comprises an opposite bore hole, and said finger portion further comprises a finger hole, said bore hole, said opposite bore hole, and said finger hole being in alignment and capable of acting in concert to threadably receive a single screw for securing said finger portion within said securing recess, said clamp head capable of being closed around said harvester reel bar at said clamp neck due to said screw being threadably received by said bore hole and said opposite bore hole.

4. The pickup tine for mounting on a harvester reel bar of agricultural equipment of claim 3 wherein said inner surface is capable of maintaining stable contact with said harvester reel bar and is responsive to tightening of said single screw for securing said pickup tine to said harvester reel bar, said inner surface becoming increasingly cohesive with respect to said harvester reel bar as said single screw is tightened.

5. The pickup tine for mounting on a harvester reel bar of agricultural equipment of claim 3 further including a finger head of said finger portion, said finger head having a protrusion extending upward beyond said inner surface and receivable within a matching hole of said harvester reel bar for stabilizing, locating and further securing said pickup tine to said harvester reel bar, said protrusion within said matching hole being further maintained as such by said single screw being threadably received by said bore hole, said finger hole, and said opposite bore hole simultaneously.

6. The pickup tine for mounting on a harvester reel bar of agricultural equipment of claim 5 wherein a region defined by said finger head is rectangular in shape and further comprises
   a width between one half and one inch;
   a thickness between one quarter and one inch; and
   a length of between three quarters and one and one half inches.

7. The pickup tine for mounting on a harvester reel bar of agricultural equipment of claim 5 wherein said protrusion further comprises:
   a diameter of up to one half of an inch; and
   a length of up to one quarter of an inch.

8. The pickup tine for mounting on a harvester reel bar of agricultural equipment of claim 3 further comprising a protective rim on said rearward clamp circumferentially around said bore hole for discouraging unintended loosening of said single screw threadably received within said bore hole.

9. The pickup tine for mounting on a harvester reel bar of agricultural equipment of claim 1 further comprising:
   an extension of said forward clamp into said securing recess; and
   a receiving portion of said finger portion for receiving said extension, said extension capable of adding security between said finger portion and said forward clamp.

10. The pickup tine for mounting on a harvester reel bar of agricultural equipment of claim 1 wherein said extension further comprises said opposite bore hole, said receipt of said single screw there through provides further security between said finger portion and said forward clamp.

11. The pickup tine for mounting on a harvester reel bar of agricultural equipment of claim 9 or claim 10 wherein said extension is of said rearward clamp.

12. The pickup tine for mounting on a harvester reel bar of agricultural equipment of claim 1 wherein said clamp neck extends downwardly from said clamp head, said pickup tine further comprising:

a wing extending longitudinally from said clamp neck and running parallel to and beneath said harvester reel bar when said pickup tine is attached thereto, said wing having a wing recess at an outermost end of said wing and capable of receiving an opposing wing recess of an adjacent pickup tine; and an opposite wing opposite said wing extending longitudinally from said clamp neck and running parallel to and beneath said harvester reel bar when said pickup tine is attached thereto, said opposite wing having an opposite wing recess at an outermost end of said opposite wing and capable of receiving a wing recess of an adjacent pickup tine, said plurality of pickup tines capable of maintaining contact and acting in unison due to a plurality of receivable wing recesses of said plurality of pickup tines.

13. The pickup tine for mounting on a harvester reel bar of agricultural equipment of claim 12 wherein said wing and said opposite wing are of differing lengths.

14. A pickup tine for mounting on a harvester reel bar of agricultural equipment consisting of a finger portion which further comprises:

a finger head receivable within a securing recess of a clamp portion of said pickup tine;

a middle recess within a side of said finger portion extending downward from below said finger head and terminating at a finger tip of said finger portion; and an opposite middle recess within an opposite side of said finger portion extending downward from below said finger head and terminating at a finger tip of said finger portion, said clamp portion further comprising a clamp head with an inner surface cohesively securable to said harvester reel bar, said finger portion having a design shape for raking of agricultural products in a forward direction in unison with a plurality of finger portions of a plurality of pickup tines simultaneously mounted to said harvester reel bar, said design shape being concave with respect to said agricultural products and said forward direction.

15. The pickup tine for mounting on a harvester reel bar of agricultural equipment of claim 14 further comprising a finger body extending downward from said finger head and terminating at said finger tip, said finger body of tapering thickness and width in the direction of said finger tip, said finger head being of a constant thickness and width.

16. The pickup tine for mounting on a harvester reel bar of agricultural equipment of claim 15 wherein said finger body further comprises:

an uppermost region having a width of between one half and one inch and a thickness of between one quarter and one inch; and a lower most region at said finger tip having a width up to one half of an inch and a thickness of up to one half of an inch.

17. The pickup tine for mounting on a harvester reel bar of agricultural equipment of claim 15 wherein said middle recess further comprises:

a steep taper extending downward from below said finger head and tapering to a degree greater than the tapering of said finger body and terminating at an apex; and a spine taper extending downward from said apex and tapering to a degree less than that of said steep taper, said spine taper terminating at said finger tip, said steep taper underlying said finger body at a thick wide area opposite said finger tip thereby providing increased flexibility to said thick wide area.

* * * * *